Sept. 30, 1952
G. A. HIGHBERG
2,612,378
CHUCK
Filed Aug. 20, 1949
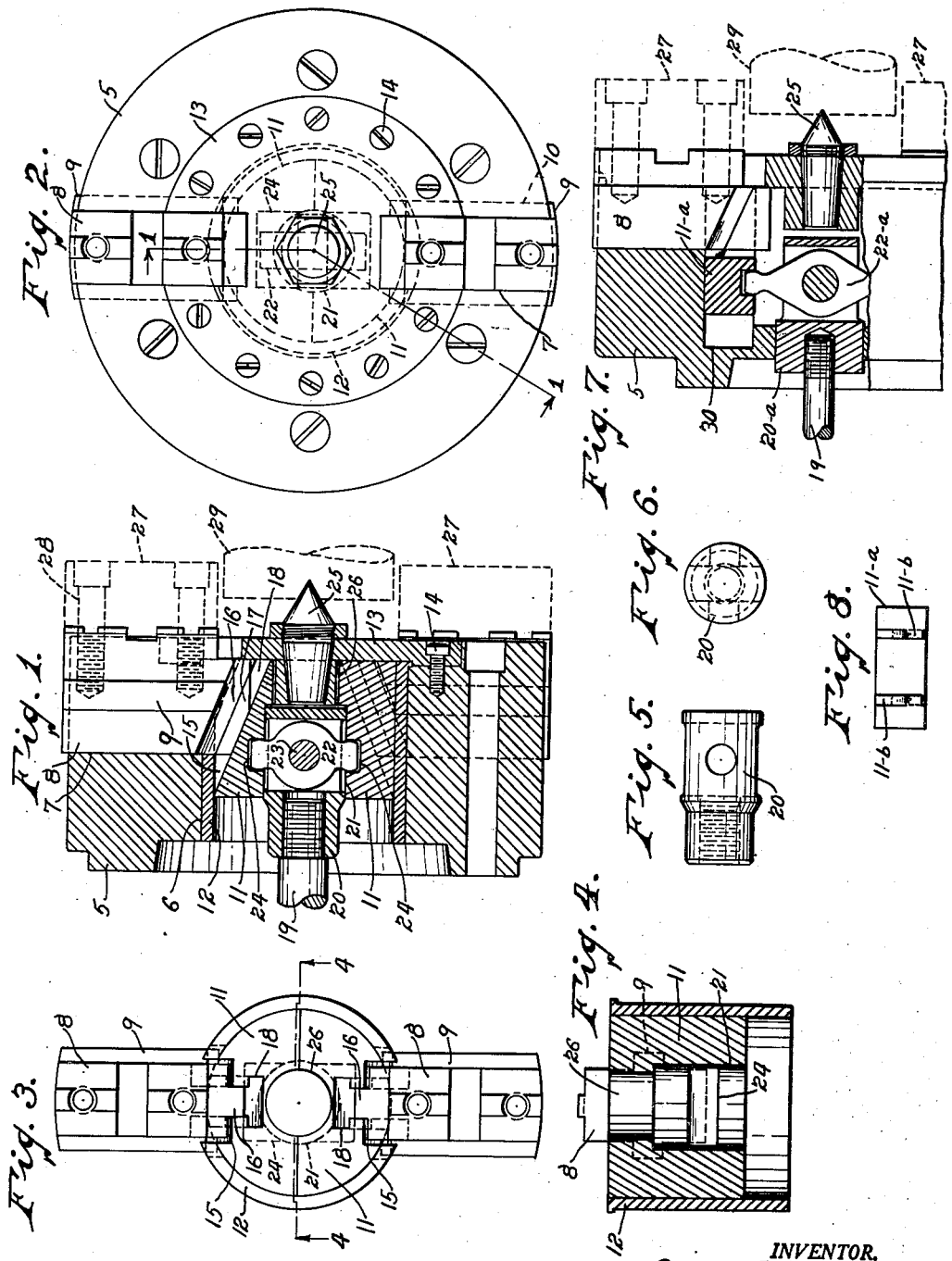
INVENTOR.
GEORGE A. HIGHBERG
BY
Louis V. Lucia
ATTORNEY.

Patented Sept. 30, 1952

2,612,378

UNITED STATES PATENT OFFICE 2,612,378

CHUCK

George A. Highberg, West Hartford, Conn., assignor to The Whiton Machine Company, New London, Conn.

Application August 20, 1949, Serial No. 111,372

4 Claims. (Cl. 279—121)

1

This invention relates to chucks and more particularly to automatic chucks such as especially intended to be hydraulically or otherwise actuated for causing combined operation of the jaws to clamp or release a piece of work.

It is an object of this invention to provide a jaw-operating mechanism including equalizing means whereby a plurality of jaws thereon may be operated to close upon a piece of work and become self-adjusted thereon to compensate for any off-center positioning of the work and thereby provide uniform pressure between all of the said jaws and the work.

It is a further object of this invention to provide such a mechanism which is simple and efficient in its operation as well as economical to produce.

Further objects and advantages of this invention will be more clearly understood from the following description and from the accompanying drawings in which:

Fig. 1 is a side view, in central vertical section on line 1—1 of Fig. 2, of a chuck embodying my invention with parts illustrated in dotted lines.

Fig. 2 is a front view of said chuck.

Fig. 3 is a front view showing only certain parts of the jaw-operating mechanism.

Fig. 4 is a side view thereof in central vertical section.

Fig. 5 is a side view of the equalizer operating head.

Fig. 6 is an end view thereof.

Fig. 7 is a side view, partly in section, of a modified form of chuck embodying my invention.

Fig. 8 is an end view of one of the jaw operating blocks used in said modified form.

In the embodiment illustrated in the drawings, the numeral 5 denotes the base of my improved chuck which is annular in shape and has an axial bore 6 to receive therein the operating mechanism involving my present invention. The said base is provided with radially extending slots 7 within each of which there is slidably contained a jaw-carrying member 8 preferably having projecting flanges 9 fitting in grooves 10 along the sides of said slots to retain the said jaw-carrying members therein.

My improved operating mechanism includes a pair of operating blocks 11—11 which are slidable in a bushing 12 that is snugly contained within the bore 6 and retained therein by means of a cover plate 13 that is secured to the face of the base by means of screws 14.

Each of said blocks 11—11 is preferably semicircular in shape and has an angularly disposed slot 15 to which is interconnected a portion 16 projecting from the inner end of the respective jaw member 8; the said member being connected to the block 11 by means of projecting flanges 17 which are slidably contained in slots 18 in the opposite walls of the annular slots 15.

The blocks 11—11 are actuated for the operation of the jaws by means of a plunger 19 which may be hydraulically or otherwise operated and has a head 20 which extends into a recess 21 between the blocks 11—11. The said head carries an equalizing connecting member 22 that is pivotally mounted in a transverse opening in said head by means of a pin 23 and extends across the recess 21 into notches 24—24 which receive reduced portions that project from said equalizing member.

A suitable centering member 25 is preferably mounted in a tapered recess in the plate 13 and a rearward extension thereon which projects into a recess 26 between the two blocks 11—11.

As illustrated in dotted lines in Fig. 1, suitable jaws 27, which may be specially shaped for different forms of workpieces, are secured to the members 8 by means of screws, indicated at 28, to engage a piece of work, indicated at 29, that is mounted on the center 25 and rotates with the chuck in the operation of the machine on which the said chuck is used.

The operation of the mechanism above described is as follows:

Assuming that the jaw-carrying members 8 are in their outward position as illustrated in Fig. 1, the jaws 27 are in open position to permit the piece of work 29 to be inserted therebetween and mounted upon the center 25. The plunger 19 is then pulled in a direction away from the chuck and this will draw the two blocks 11—11 rearwardly, through the connecting member 22, and cause the said members 8—8 to move inwardly on the chuck body and close the jaws 27—27 against the outer surface of the workpiece 29. Should there be any irregularity in the surface of the workpiece 29 which would render it off-center relative to the axis of the chuck, the equalizing member 22 will rock upon its pivot pin 23 and thereby equalize the amount of pull exerted on the opposite blocks to compensate for said irregularity, as the jaws engage the work, and thereby cause a uniform pressure between the different jaws and the work without disturbing the position of the work upon the center.

When it is desired to release a piece of work from the jaws, the jaws 27—27 are opened by moving the plunger 19 in the opposite direction, The jaw-opening movement of the mechanism may be limited by contact between the blocks 11—11 and the plate 13 thereby causing the members 8 to return to their respective normal positions.

It will be clearly understood from the above description that my invention provides a novel mechanism whereby the chuck jaws may be applied, with uniform pressure, to a piece of work which is mounted upon the axis of the chuck, even though the outer surface of the work may not be concentric with the said axis, and thereby provide a means which is highly useful in chucking pieces of work for roughing operation, or even finishing operations, on work having irregular or off-center contours.

In the modified forms illustrated in Figs. 7 and 8, sliding blocks 11-a are used instead of the semi-circular blocks 11—11 of the preferred form. These blocks 11-a are slidably mounted in recesses 30 in the chuck body which communicate with an axial bore in which the head 20-a of the operating bar is slidably mounted and carries the equalizing lever 22-a which operatively connects the said head with the operating blocks 11-a. It will be noted that the said blocks are U-shaped and have, at their inner sides, angularly disposed ribs 11-b which fit within corresponding grooves in the opposite sides of the chuck jaws to move them radially with relation to the chuck center, in the same manner as the jaws illustrated in Fig. 1 are moved by the semi-circular blocks 11.

I claim:

1. A chuck comprising a base having a plurality of jaws radially slidable thereon, a plurality of arcuate members forming a circle co-axial with said base and each separately connected to one of said jaws for moving the jaw on the base, an operating bar co-axial with the base, a head on said bar slidable between said members, and equalizing means pivotally connected to said head and extending therefrom into contact with each of said members for simultaneously moving the members for different distances with equal tension to thereby move the jaws to different positions relatively to the axis of the base and permit engagement thereof with portions of a separate member located in off-center relation relatively to said axis.

2. A chuck as set forth in claim 1 wherein the said arcuate members are connected to the jaws with a slot and tongue connection disposed at an angle for permitting movement of the jaws in a direction perpendicular to the direction of movement of the said members.

3. A chuck comprising a base, a pair of jaws radially moveable on said base, a pair of diametrically opposed semi-circular blocks forming a split ring co-axial with said base, each of said blocks having an angular slot and tongue connection with one of said jaws to provide radial movement of the jaw upon longitudinal movement of the block, an operating bar co-axial with said base and having an end portion slidable in a recess provided between the said semi-circular blocks, and a recess extending across said end portion of the bar, an equalizing member pivotally mounted in said recess and extending from opposite sides thereof with each of its opposite ends fitting into a recess in the inner side of its respective block to thereby provide unequal movement of said blocks along the axis of the chuck to radially move the said jaws to different positions relatively to said axis and provide engagement, with uniform pressure, between the said jaws and portions of a member in said chuck located at different distances from the said axis.

4. A chuck comprising a circular base having an axial bore, a bushing positioned in said bore and a pair of radial slots in said bore communicating therewith and extending through the bushing, a pair of semi-circular blocks slidably positioned in said bushing and forming a ring with an axial opening therethrough, an operating bar, a head on said bar slidable in said opening, an equalizing member pivotally connected to said head and having its end portions extending from opposite sides of said head into operative engagement with each of said blocks, a plate closing the end of the axial bore for retaining the said bushing therein, a center member co-axially positioned on said chuck and mounted between said blocks, a cam connection between each of said blocks and its respective jaw for transforming longitudinal movement of the blocks, upon being actuated by the operating bar, into radial movement of the jaws; the said equalizing member permitting the blocks to move the jaws into contact with off-center portions of the workpiece under equal pressure.

GEORGE A. HIGHBERG.

REFERENCES CITED

The following references are of record in the file of this patent:

UNITED STATES PATENTS

| Number | Name | Date |
| --- | --- | --- |
| 1,829,619 | Svenson | Oct. 27, 1931 |
| 1,886,083 | Church | Nov. 1, 1932 |
| 1,934,975 | Groene | Nov. 14, 1933 |